US012593227B2

(12) United States Patent (10) Patent No.: US 12,593,227 B2
Agarwal et al. (45) Date of Patent: Mar. 31, 2026

(54) DEADLINE-BASED DELIVERY FOR DOWNLINK TRAFFIC WITH JITTER

(71) Applicant: QUALCOMM Incorporated, San Diego, CA (US)

(72) Inventors: Ravi Agarwal, San Diego, CA (US); Prashanth Haridas Hande, San Diego, CA (US); Peerapol Tinnakornsrisuphap, San Diego, CA (US); Tao Luo, San Diego, CA (US); Olufunmilola Omolade Awoniyi-Oteri, San Diego, CA (US); Yuchul Kim, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 355 days.

(21) Appl. No.: 17/516,643

(22) Filed: Nov. 1, 2021

(65) Prior Publication Data

US 2023/0135681 A1 May 4, 2023

(51) Int. Cl.
| | |
|---|---|
| *H04W 24/08* | (2009.01) |
| *H04L 1/1607* | (2023.01) |
| *H04L 1/20* | (2006.01) |
| *H04L 5/00* | (2006.01) |

(52) U.S. Cl.
CPC .......... *H04W 24/08* (2013.01); *H04L 1/1642* (2013.01); *H04L 1/205* (2013.01); *H04L 5/0082* (2013.01)

(58) Field of Classification Search
CPC .... H04W 24/08; H04W 28/02; H04L 1/1642; H04L 1/205; H04L 5/0082; H04L 47/286
See application file for complete search history.

(56) References Cited

U.S. PATENT DOCUMENTS

| | | | | |
|---|---|---|---|---|
| 2007/0237091 | A1* | 10/2007 | Lin ..................... | H04L 43/0852 |
| | | | | 370/468 |
| 2012/0151041 | A1* | 6/2012 | Gerber .................... | H04W 8/22 |
| | | | | 709/224 |
| 2019/0075585 | A1* | 3/2019 | Deogun ............ | H04W 72/1273 |
| 2019/0215263 | A1 | 7/2019 | Lee et al. | |
| 2019/0313419 | A1* | 10/2019 | Fakoorian ......... | H04W 28/0278 |
| 2020/0100286 | A1* | 3/2020 | Xu .......................... | H04L 1/187 |
| 2020/0120536 | A1 | 4/2020 | Prakash et al. | |

(Continued)

FOREIGN PATENT DOCUMENTS

| | | | | |
|---|---|---|---|---|
| WO | WO-2020259456 | A1* | 12/2020 | ........... H04L 1/1841 |
| WO | 2021004630 | A1 | 1/2021 | |
| WO | WO-2022161608 | A1* | 8/2022 | |

OTHER PUBLICATIONS

International Search Report and Written Opinion—PCT/US2022/077803—ISA/EPO—Jan. 17, 2023.

*Primary Examiner* — Kevin T Bates
*Assistant Examiner* — Hector Reyes
(74) *Attorney, Agent, or Firm* — Patterson & Sheridan, LLP

(57) ABSTRACT

Certain aspects of the present disclosure provide techniques that may help ensure downlink packet bursts are delivered to a UE within a deadline. Certain aspects provide a method wireless communications by a user equipment (UE), comprising determining a deadline for arrival of bursts of packets at the UE, sending an indication of the deadline to a network entity, and monitoring for bursts of packets from the network entity in accordance with the deadline.

22 Claims, 15 Drawing Sheets

(56)                 References Cited

U.S. PATENT DOCUMENTS

| 2020/0351804 | A1* | 11/2020 | Moon | .................. | H04W 56/001 |
| 2021/0105192 | A1* | 4/2021 | Kahn | .................. | H04L 41/5009 |
| 2022/0217034 | A1* | 7/2022 | Han | ...................... | H04L 5/0053 |
| 2023/0180207 | A1* | 6/2023 | Rossbach | ............ | H04W 72/535 |
| | | | | | 370/329 |
| 2023/0199600 | A1* | 6/2023 | Xu | ........................ | H04W 72/54 |
| | | | | | 370/331 |

\* cited by examiner

400

700

702 determine a deadline for arrival of bursts of packets at the UE (e.g., from Application Client)

704

Indicate Deadline

Burst N arrives at BS 706

BS sends Burst N to UE in accordance with the deadline 708

1000

1002 determine a deadline for arrival of bursts of packets at the UE (e.g., based on NominalArrivalTime, NominalPDB & Periodicity)

UE

BS

Burst N arrives at BS 1006

•••

•••

BS sends Burst N to UE in accordance with the deadline 1008

1200

A METHOD FOR WIRELESS COMMUNICATIONS BY A USER EQUIPMENT (UE)

1210

DETERMINE A DEADLINE FOR ARRIVAL OF BURSTS OF PACKETS AT THE UE

1220

SEND AN INDICATION OF THE DEADLINE TO A NETWORK ENTITY

1230

MONITOR FOR BURSTS OF PACKETS FROM THE NETWORK ENTITY IN ACCORDANCE WITH THE DEADLINE

1300

METHOD FOR WIRELESS COMMUNICATIONS BY A NETWORK ENTITY

1310

DETERMINE DEADLINES FOR ARRIVAL OF BURSTS OF PACKETS AT A USER EQUIPMENT (UE)

1320

RECEIVE BURSTS OF PACKETS

1330

SEND BURSTS OF PACKETS TO THE UE IN ACCORDANCE WITH THE DEADLINES

1400

1410

1408

Transceiver

1402

Processing System

1406

1420

1430

Processor(s)

Computer-Readable Medium/Memory

1421

Circuitry for determining a deadline for arrival of bursts of packets at the UE

1431

Code for determining a deadline for arrival of bursts of packets at the UE

1422

Circuitry for sending an indication of the deadline to a network entity

1432

Code for sending an indication of the deadline to a network entity

1423

Circuitry for monitoring for bursts of packets from the network entity in accordance with the deadline

1433

Code for monitoring for bursts of packets from the network entity in accordance with the deadline

*FIG. 14*

DEADLINE-BASED DELIVERY FOR DOWNLINK TRAFFIC WITH JITTER

INTRODUCTION

Aspects of the present disclosure apparatuses, methods, processing systems, and computer-readable mediums for enhancing delivery of bursts of packets accounting for jitter.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a user equipment (UE), comprising determining a deadline for arrival of bursts of packets at the UE; sending an indication of the deadline to a network entity; and monitoring for bursts of packets from the network entity in accordance with the deadline.

One aspect provides a method for wireless communications by a network entity, comprising determining deadlines for arrival of bursts of packets at a user equipment (UE); receiving the bursts of packets; and sending bursts of packets to the UE in accordance with the deadlines.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 14 depicts aspects of an example communications device, in accordance with certain aspects of the present disclosure.

DETAILED DESCRIPTION

Aspects of the present disclosure provide apparatuses, methods, processing systems, and computer-readable mediums for enhancing delivery of bursts of packets accounting for jitter.

Packets transmitted across a network may have differing delays, even if transmitted along the same path. Because packets are routed individually, and network devices receive packets in a queue, a network cannot guarantee constant delay pacing. Delay inconsistency between packets is known as jitter. When packets do not arrive consistently, a receiver makes necessary corrections. In some cases, a receiver cannot make the proper corrections, and packets are lost. Jitter is an issue for real-time communications, including IP telephony, video conferencing, virtual reality (VR), extended reality (XR), and virtual desktop infrastructure.

Figure 4:
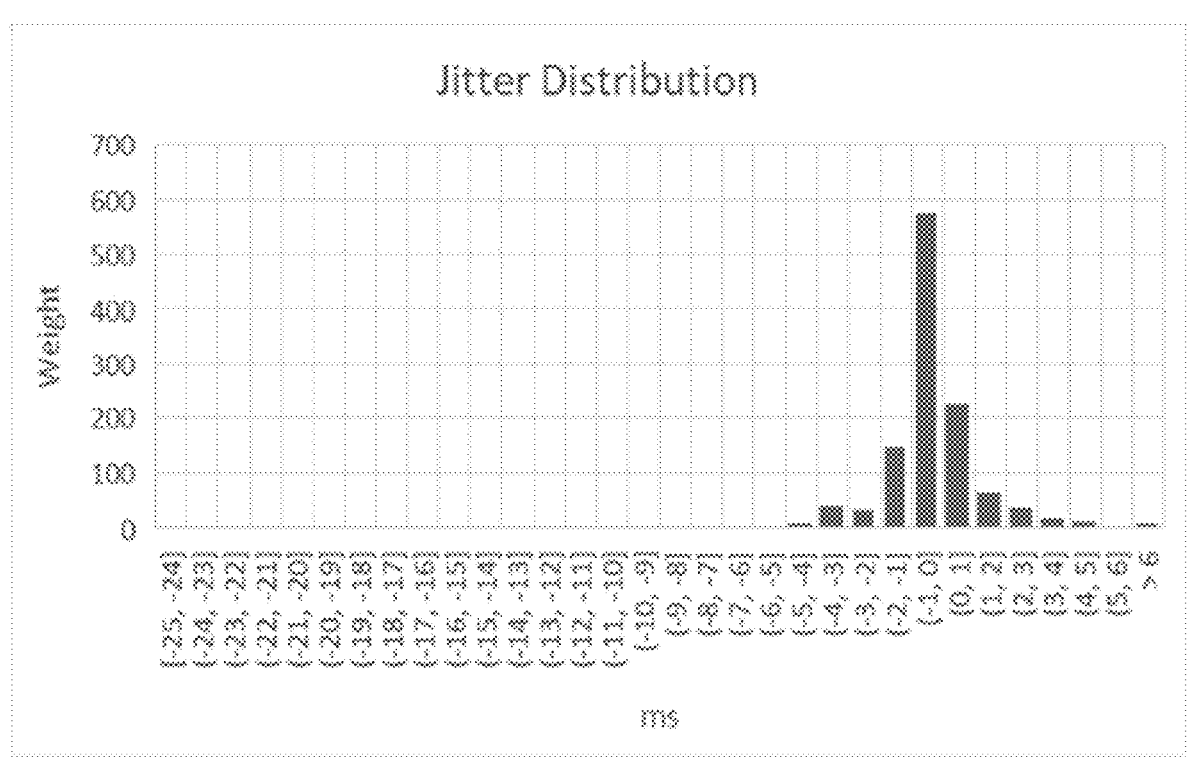
FIG. 4 illustrates example jitter distribution for downlink traffic.

In 5G new radio (NR), arrival time of a burst of packets at a user equipment (UE) on the downlink can be quasi-periodic due to jitter. Burst arrival jitter may be due to various factors, such as varying render time, varying encoder time, and varying Real-time Transport Protocol (RTP packetization time). The impact of jitter may be significant. For example, FIG. 4 shows an example of arrival jitter distribution with an approximate 10 ms spread in DL traffic arrival (e.g., for split XR data).

Conventional systems typically only measure latency as a delay from network ingress (e.g., arrival of packets from an application server) to network egress with associated packet delay bound (PDB) requirements. Unfortunately, this approach does not take into consideration arrival jitter. Tight PDB requirements may need to be specified to ensure late packet arrivals at the 5G network can be delivered on-time. Satisfying these tight PDB requirements may be challenging and excess jitter may still result in packets arriving too late at the UE.

Aspects of the present disclosure may help enhance delivery of packet bursts subject to jitter, by taking a deadline based approach to defining latency objectives. As will be described in greater detail below, the network may attempt to deliver a burst by its deadline, rather than focus solely on PDB. Delivery of packets that arrive at the network with jitter, based on a deadline for arrival time at the UE, may be more efficient and may lead to higher actual capacity.

A deadline-based approach may allow the network more time to deliver early arriving bursts, while late arriving bursts could experience the same PDB as specified without arrival jitter. Thus, the approach presented herein may allow the network to effectively exploit traffic arrival jitter, taking longer to deliver early arriving bursts which, if delivered earlier, would wait in de-jitter buffer anyway. On the other hand, the network may not delay delivery of late arriving bursts, helping to ensure they do not miss the UE arrival deadline.

Introduction to Wireless Communication Networks

Figure 1:
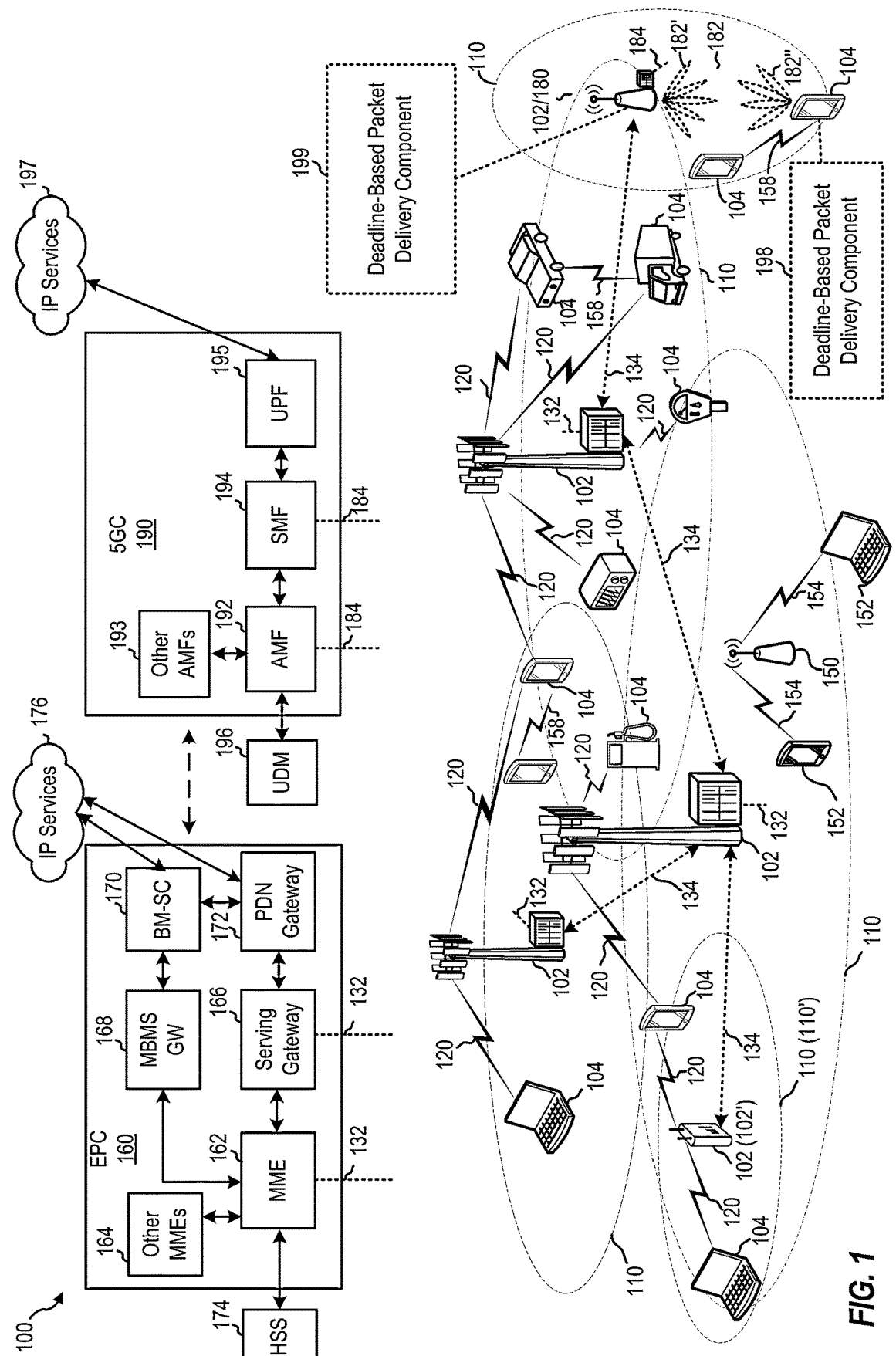
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes deadline-based packet delivery component 199, which may be configured to enhance delivery of bursts of packets accounting for jitter. Wireless network 100 further includes deadline-based packet delivery component 198, which may be used configured to enhance delivery of bursts of packets accounting for jitter.

Figure 2:
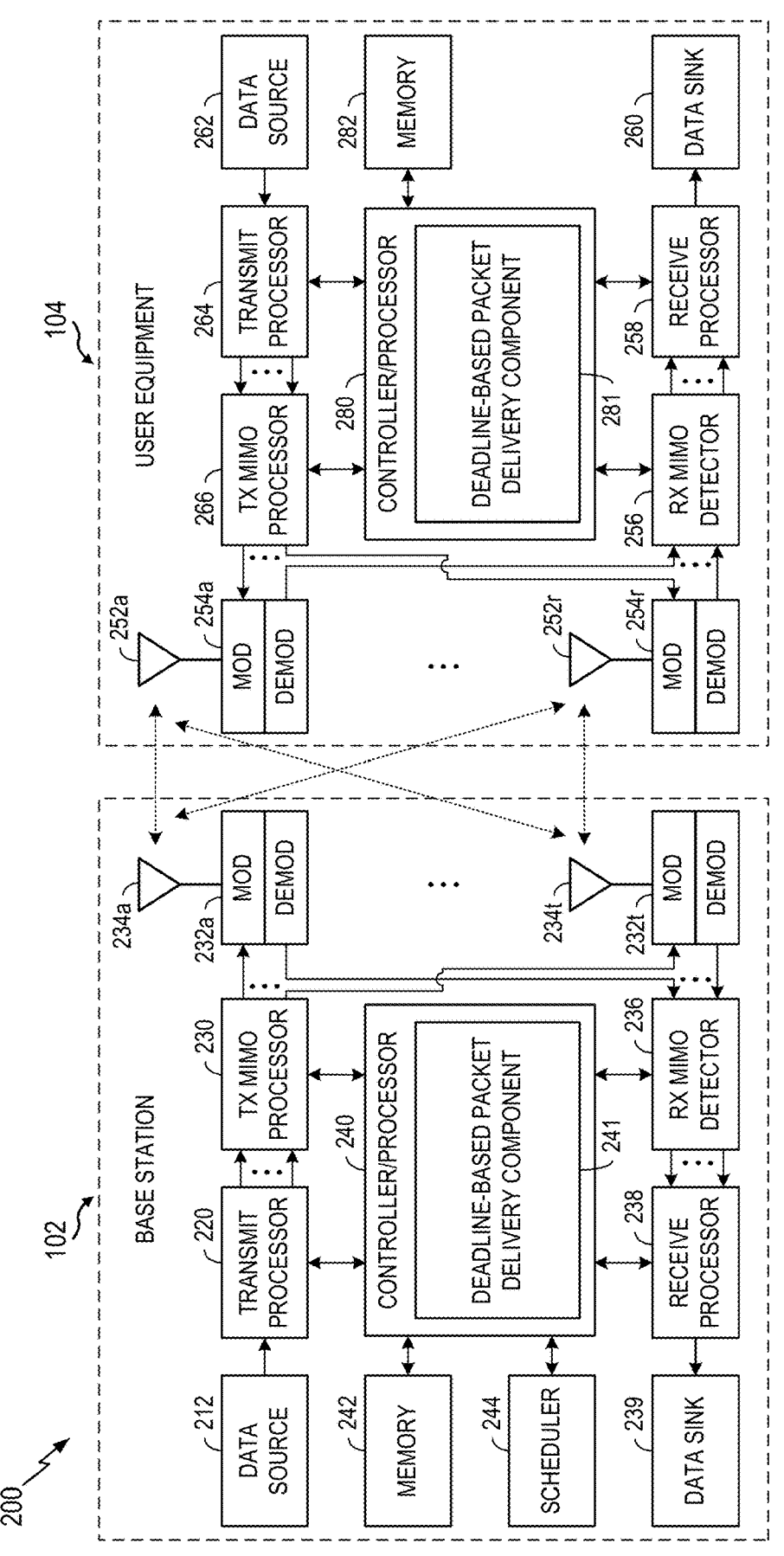
FIG. 2 is a block diagram conceptually illustrating aspects of an example of a base station and user equipment.

FIG. 2 depicts aspects of an example system 200, including base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212)

and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes deadline-based packet delivery component 241, which may be representative of deadline-based packet delivery component 199 of FIG. 1. Notably, while depicted as an aspect of controller/processor 240, deadline-based packet delivery component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes deadline-based packet delivery component 281, which may be representative of deadline-based packet delivery component 198 of FIG. 1. Notably, while depicted as an aspect of controller/processor 280, deadline-based packet delivery component 281 may be implemented additionally or alternatively in various other aspects of user equipment 104 in other implementations.

Figure 3:
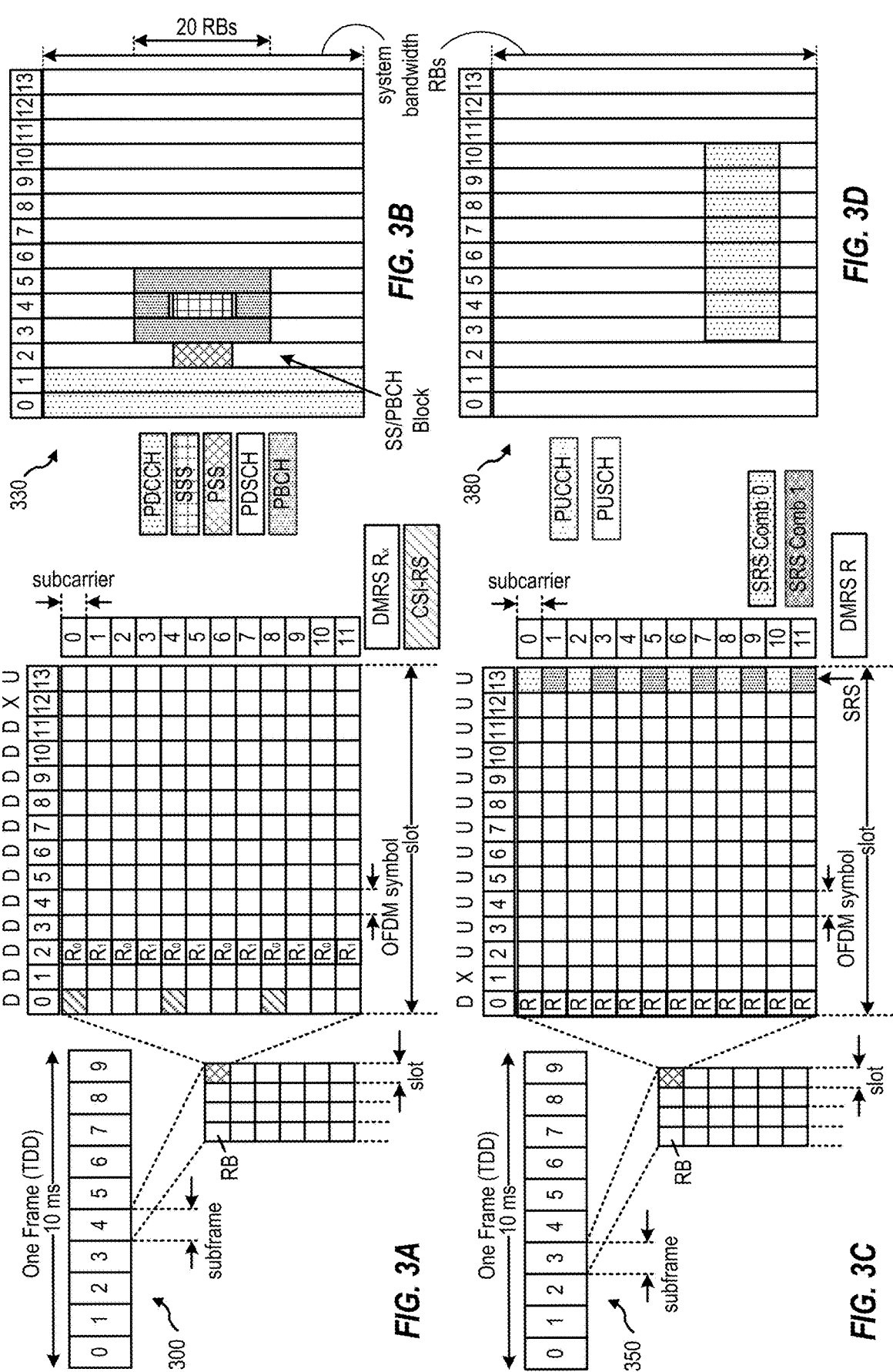
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example Packet Burst Delivery

As noted above, in 5G NR, arrival time of a burst of packets at a UE on the downlink can be quasi-periodic due to jitter. Conventional systems typically only measure latency as a delay from network ingress to network egress with an associated PDB requirement. Unfortunately, this approach does not take into consideration arrival jitter. Tight PDB requirements may need to be specified to ensure late packet arrivals at the 5G network can be delivered on-time. Satisfying these tight PDB requirements may be challenging and excess jitter may still result in packets arriving too late at the UE.

Figure 5:
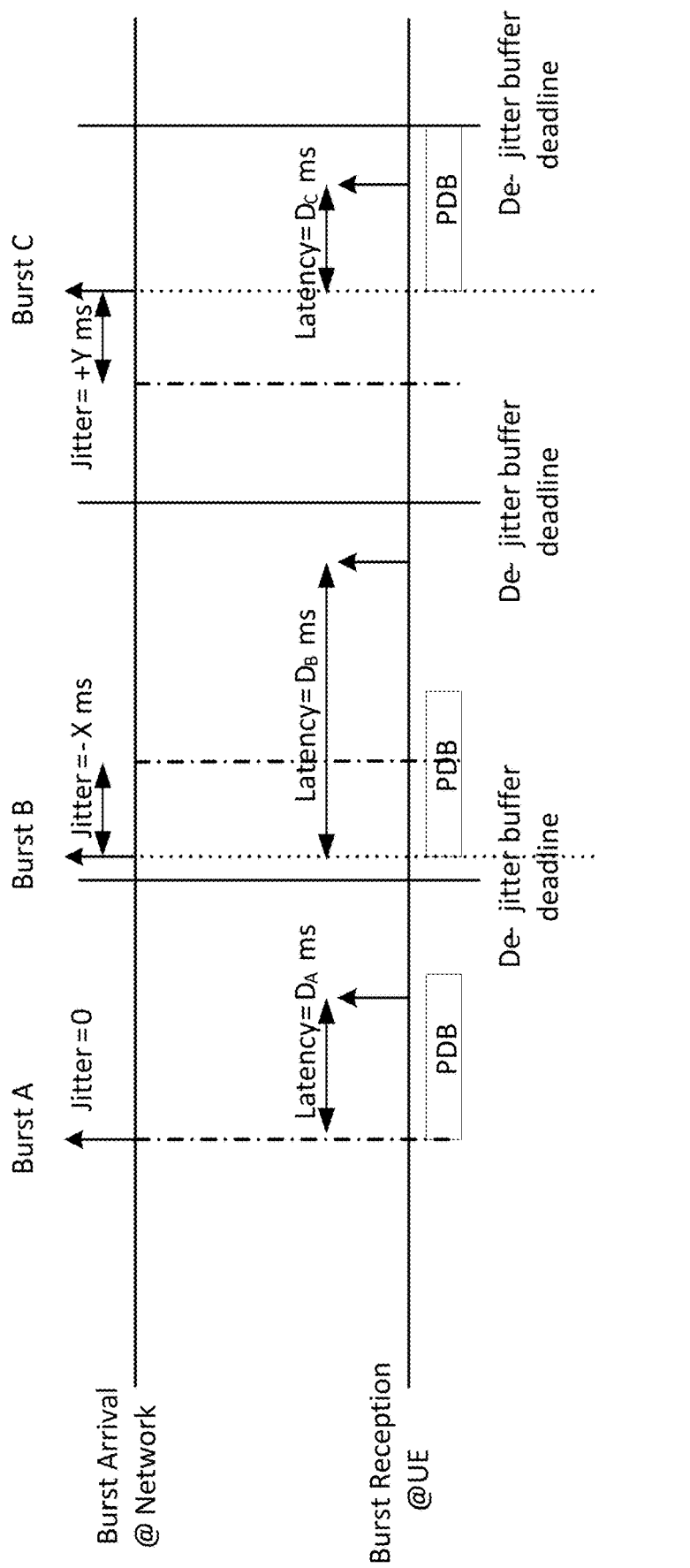
FIG. 5 and FIG. 6 are timing diagrams illustrating the impact of jitter on downlink packet delivery.

FIG. 5 depicts an example timing diagram 500 for conventional downlink packet burst deliver, based on satisfying PDB requirements. In the illustrated example, three bursts A, B, and C all arrive with different relative jitter. Despite the difference in jitter, the packets all arrive at the UE by the de jitter buffer deadline for a related application. Even though Burst B latency is higher than the PDB requirement, it has no impact from the application perspective.

Conventional network capacity simulations are typically based on arrival without jitter and a fixed PDB requirement. However, as demonstrated by the example of FIG. 5, a capacity simulation based on arrival with jitter and a deadline-based evaluation may be more representative of a real system and may lead to higher actual capacity.

A deadline-based evaluation, as proposed herein, may also allow a network (e.g., a 5G network) more time to deliver early arriving bursts. On the other hand, the network may not delay late arriving bursts would be subject to the same PDB as specified without arrival jitter.

A conventional fixed PDB requirement prevents network nodes from exploiting traffic arrival jitter. In other words, applying a conventional fixed PDB requirement, a network would deliver earlier arriving bursts early, although those early delivered bursts would have to wait in a de-jitter buffer regardless. On the other hand, it may be undesirable for a network to delay delivery of late arriving bursts, since late arriving bursts may miss their deadline at the UE (e.g., for display by an application).

To try and enhance delivery and the likelihood of packet arrival at the UE within a deadline, the network could try various options. For example, the network could adjust priority of scheduling, adjust a number of hybrid automatic repeat request (HARM) retransmissions, and/or adjust a modulation and coding scheme (MCS) for an initial transmission.

Figure 6:
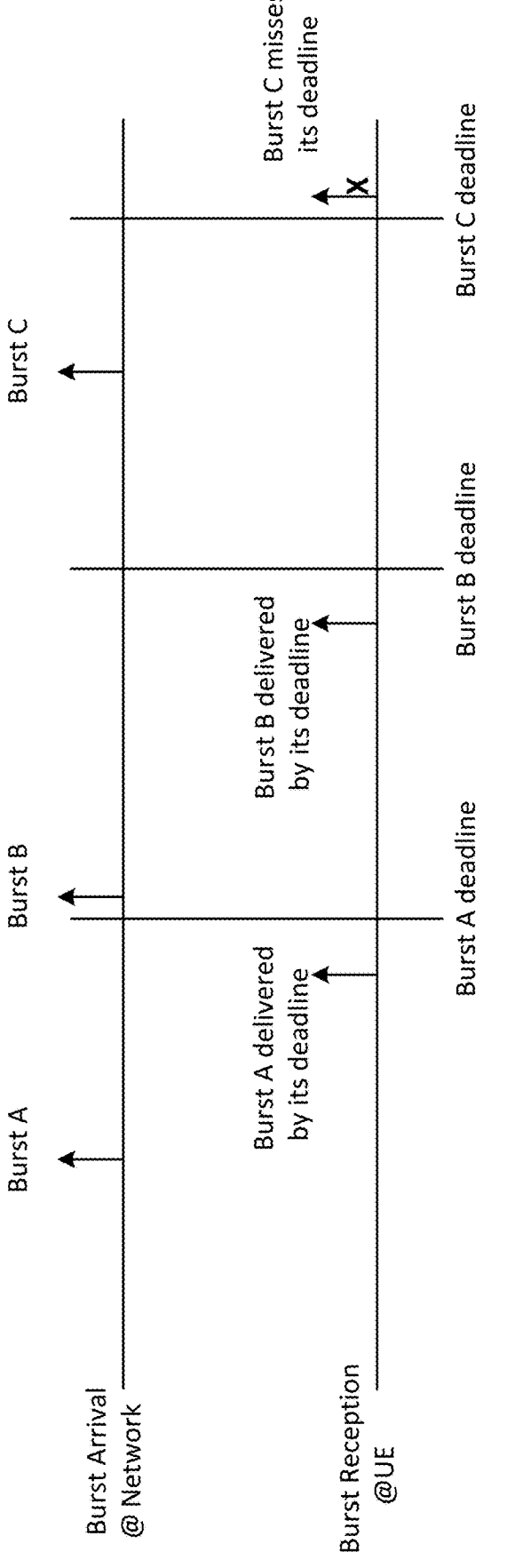

FIG. 6 illustrates an example timing diagram 600 that shows how PDB requirements could be met, while deadlines for burst delivery at the UE are not met. The example assumes the same bursts (A, B, and C) shown in FIG. 5 with the same amounts of jitter. As illustrated, while Burst C satisfies the PDB requirement (as shown in FIG. 5), the impact of jitter shown in FIG. 6 is that Burst C misses its deadline for arrival at the UE.

Example Deadline-Based Delivery for Downlink Traffic with Jitter

Aspects of the present disclosure may help enhance delivery of packet bursts subject to jitter, by taking a deadline based approach to defining latency objectives. As will be described in greater detail below, the network may attempt to deliver a burst by its deadline, rather than focus solely on PDB. As noted above, delivery of packets that arrive at the network with jitter, based on a deadline for arrival time at the UE, may be more efficient and may lead to higher actual capacity.

A deadline-based approach proposed herein may allow the network to effectively exploit traffic arrival jitter. For example, the deadline-based approach may allow the network to take longer to deliver early arriving bursts which, if delivered earlier, would wait in de-jitter buffer anyway, while delivering late arriving bursts with little or no delay, helping to ensure they do not miss the UE arrival deadline.

There are various approaches for a base station (e.g., a gNB) to determine what the deadline for arrival time at the UE is for a given burst of packets. In some cases, the UE may indicate the deadline to the base station. In such cases, the base station may deliver bursts based on the deadline indicated by the UE and other information (e.g., a burst periodicity and/or a nominal PDB).

In other cases, the base station may determine the deadline on its own (e.g., based on information from an application server (e.g., the source of the downlink bursts to an application client on the UE) or an application function (AF). An AF is a core network function that generally performs operations such as accessing the network exposure function for retrieving resources, interactions with a policy control function (PCF) for policy control, and exposing services to end users.

Figure 7:
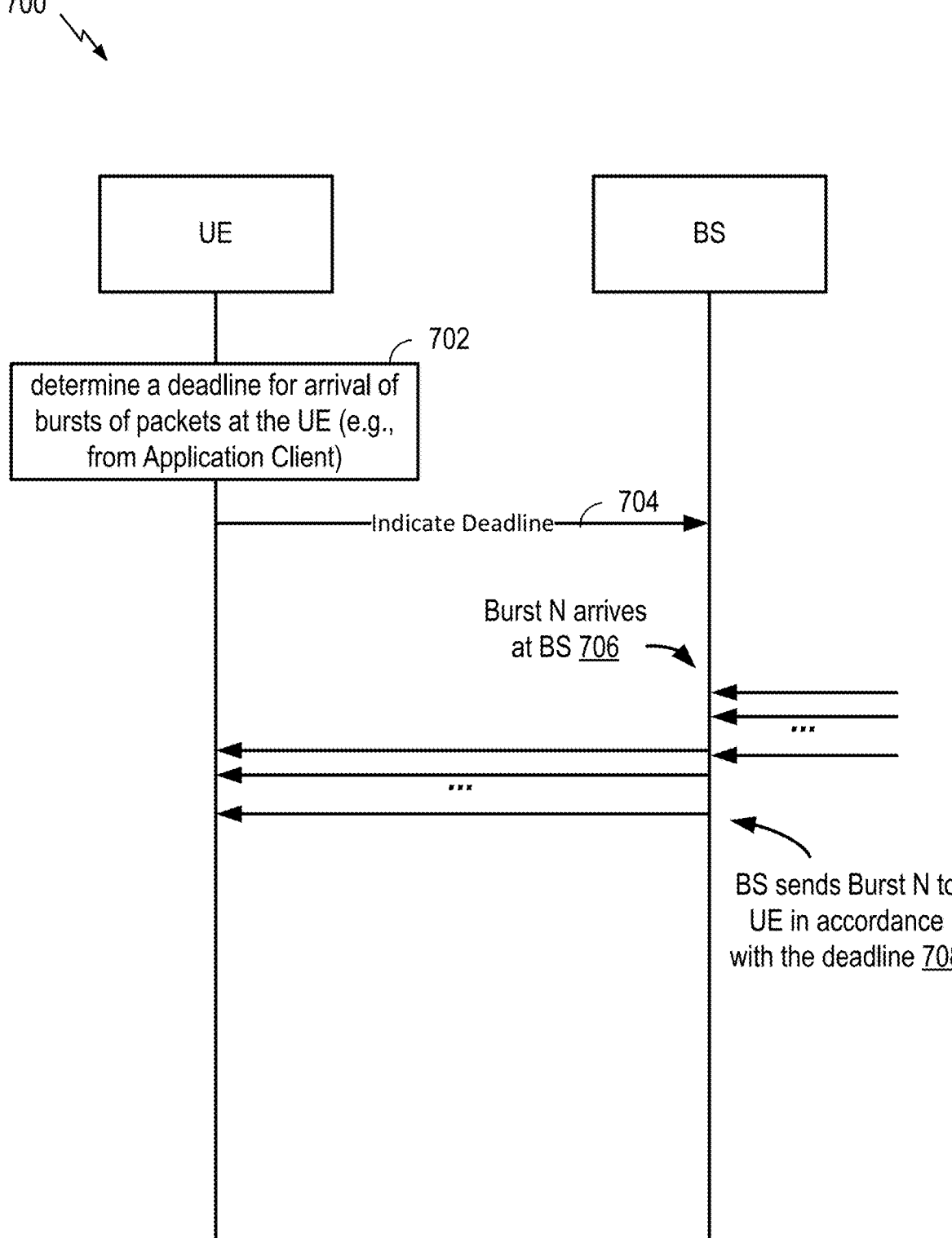
FIG. 7 is a call flow diagram depicting one example of deadline-based downlink packet delivery, in accordance with certain aspects of the present disclosure.

FIG. 7 is a call flow diagram 700 depicting one example of deadline-based downlink packet delivery by a base station (e.g., a gNB), based on an indication of the deadline provided by a UE.

As illustrated, at 702, the UE determines a deadline for arrival of bursts of packets at the UE. In some cases, an application client (running on the UE) may provide the UE with an indication of the deadline (e.g., for that application).

At 704, the UE signals an indication of the deadline to the BS. For example, the UE could signal the indication via a medium access control (MAC) control element (CE) or any other suitable signaling mechanism.

In some cases, the UE may convert the deadline (e.g., indicated by the application client in units of time) to network transmission time intervals (TTIs) and signal that to the network. For example, for 5G, the UE may convert the deadline time to a system frame number (SFN) and/or a slot number (slot#).

At 706, a burst of packets (burst N) arrives at the BS. At 708, the BS delivers the burst of packets to the UE in accordance with the deadline. For example, while the BS may delay delivery to the UE of early arriving bursts, it may not delay (or minimally delay) later arriving bursts, in an effort to ensure all bursts arrive at the UE within the indicated deadline.

Exactly how the network uses UE indicated deadline in order to deliver bursts to the UE in time may vary. For example, in some cases, the network may determine a deadline, for a given burst, based on the burst number (provided by the application server) and a burst periodicity. In some cases, the burst number N (and/or burst periodicity) may be explicitly indicated to the network entity. For example, the application server may indicate the burst number N for packets belonging to the $N^{th}$ burst, as well as the periodicity.

Assuming the bursts arrive according to the periodicity (subject to jitter), the network may determine the deadline for each burst to be delivered to the UE. For example, the BS may determine that packet(s) belonging to the $N^{th}$ burst (burst number N) should be delivered by:

$$Deadline_{BurstN} = Deadline + N^*Periodicity.$$

Figure 8:
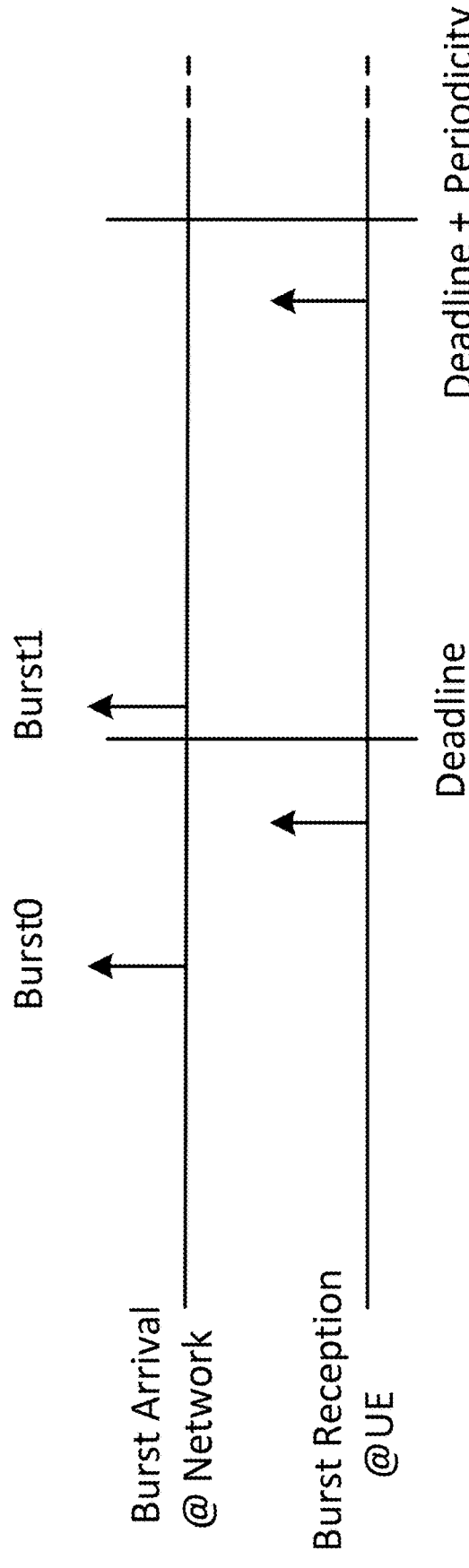
FIG. 8 and FIG. 9 are timing diagrams illustrating deadline-based downlink packet delivery, in accordance with certain aspects of the present disclosure.

A simple example of this approach is illustrated by the timing diagram 800 of FIG. 8, which shows the delivery deadlines for two bursts, Burst 0 and Burst 1. Using the simple equation above, the deadline for Burst 0 is the Deadline, while the deadline for Burst 1 is Deadline+Periodicity.

In some cases, in the network may determine a delivery deadline, for a given burst, based on a burst periodicity and a nominal PDB. The nominal PDB may be indicated by the application function (AF). As illustrated in the timing diagram 900 of FIG. 9, the network may define a periodically occurring time window (Tn), based on the nominal PDB and periodicity, as:

$$Deadline - NominalPDB + n^*Periodicity \pm Periodicity/2.$$

Packet(s) arriving within this time window, may have a delivery deadline of:

$$Deadline + n^*Periodicity.$$

Figure 9:
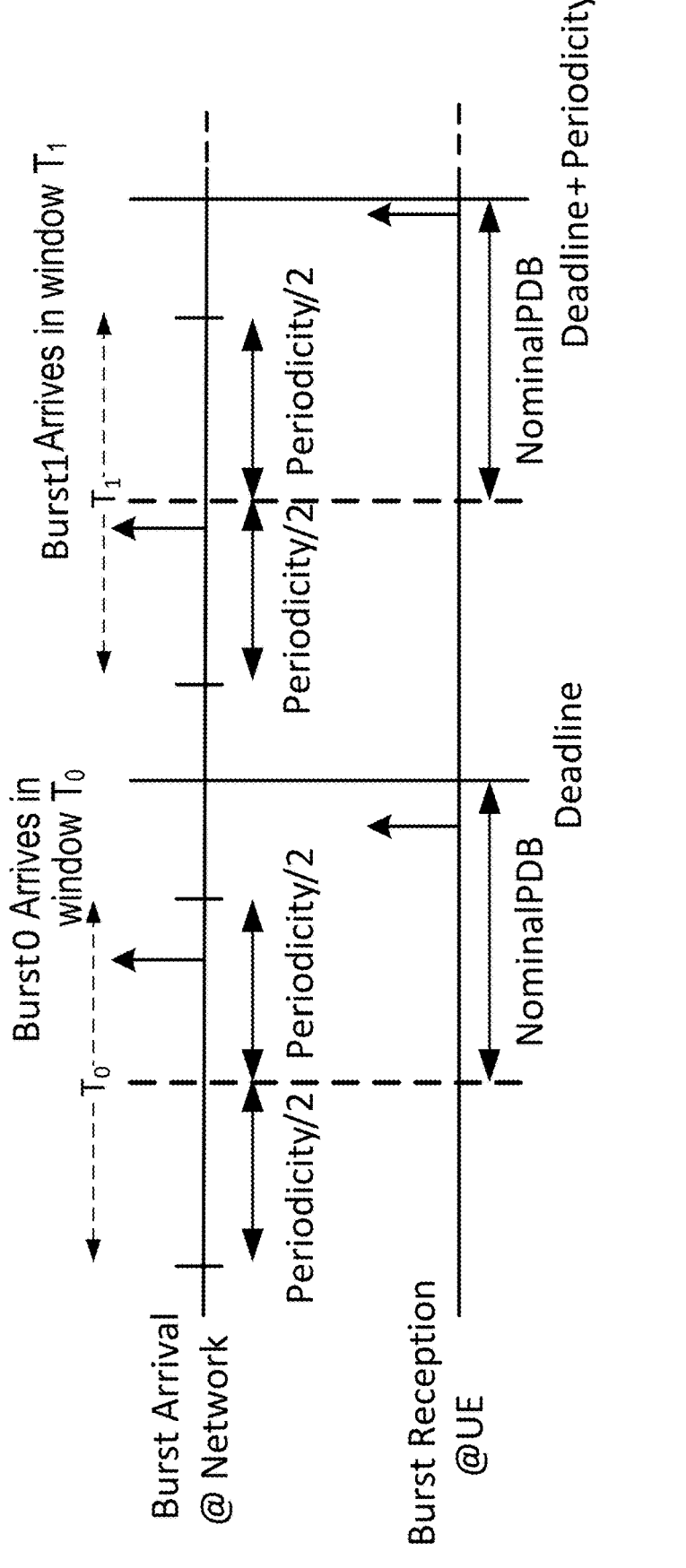

For the example shown in FIG. 9, Burst 0 arrives within a first window $T_0$ (Tn, n=0):

$$Deadline - NominalPDB \pm Periodicity/2,$$

therefore, the network determines a burst delivery deadline at the UE of Deadline. Burst 1 arrives within a first window $T_1$ (Tn, n=1):

$$Deadline - NominalPDB + Periodicity \pm Periodicity/2,$$

and, therefore the network determines a burst delivery deadline at the UE of Deadline+Periodicity.

According to certain aspects (such as those approaches depicted in FIGS. 8 and 9), the application may attempt to ensure sufficient time is allocated between a nominal burst arrival time and corresponding deadline. To do so, certain mechanisms, such as implementing a phase-locked loop or time synchronize with the client, may be used to adjust burst generation time at server.

Figure 10:
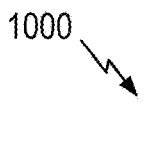
FIG. 10 is a call flow diagram depicting one example of deadline-based downlink packet delivery, in accordance with certain aspects of the present disclosure.

As illustrated by the call flow diagram 1000 of FIG. 10, in some cases, the network may determine (at 1002) a burst delivery deadline based on a nominal arrival time (NominalArrivalTime), a nominal PDB (NominalPDB), and burst periodicity (Periodicity). After a Burst N arrives at the BS, at 1006, the network sends packet(s) of Burst N to the UE in accordance with the deadline, at 1008.

According to certain aspects, the network determines the deadline based on a nominal PDB (NominalPDB), nominal arrival time (NominalArrivalTime), and burst periodicity. For example, as illustrated in the timing diagram 1100 of FIG. 11, the network may define a periodically occurring time window (Tn), based on the nominal arrival time and periodicity, as:

$$NominalArrivalTime + n^*Periodicity \pm Periodicity/2.$$

Packet(s) arriving within this time window, the have a delivery deadline of:

$$NominalArrivalTime + NominalPDB + n^*Periodicity.$$

Figure 11:
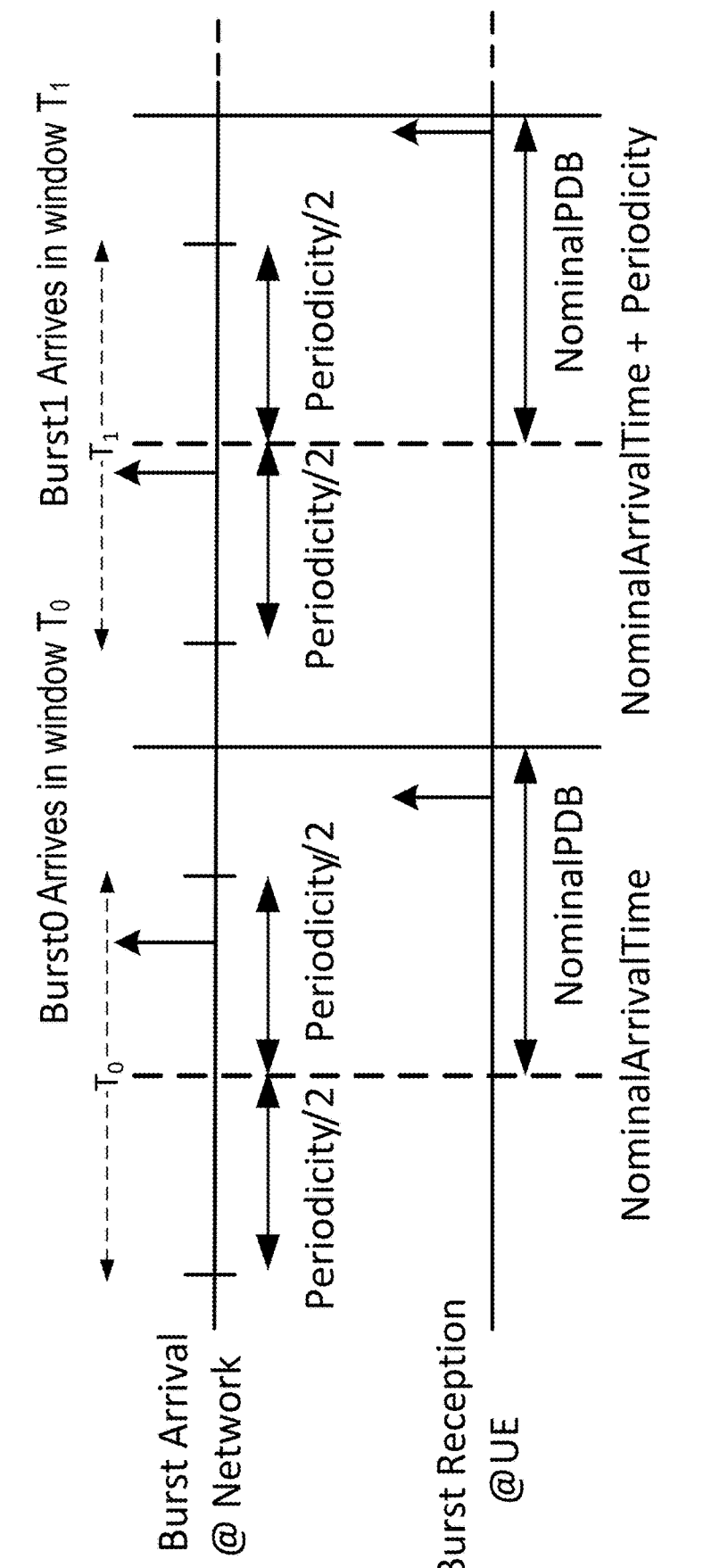
FIG. 11 is a timing diagram illustrating deadline-based downlink packet delivery, in accordance with certain aspects of the present disclosure.

For the example shown in FIG. 11, Burst 0 arrives within a first window $T_0$ (Tn, n=0):

$$NominalArrivalTime \pm Periodicity/2,$$

therefore, the network determines a burst delivery deadline at the UE of:

$$NominalArrivalTime + NominalPDB.$$

Burst 1 arrives within a first window $T_1$ (Tn, n=1):

$$NominalArrivalTime + Periodicity \pm Periodicity/2,$$

therefore, the network determines a burst delivery deadline at the UE of:

$$NominalArrivalTime + Periodicity + NominalPDB.$$

In some cases, the Application Function explicitly indicates NominalArrivalTime, NominalPDB and the burst periodicity. In other cases cases, the Application Function may only explicitly indicate NominalPDB and the network may infer the Nominal arrival time and the burst periodicity. For example, in such case, the burst periodicity and arrival may be inferred (approximated) based on observed arrival times of a sequence of bursts:

$$Periodicity = mean \ (Burst \ Inter-arrival \ Time); \ and$$

$$ArrivalJitter = std. \ dev \ (Burst \ Inter-arrival \ Time).$$

The network may infer the nominal arrival time based on a center of mass of the distribution of observed arrival times:

$$NominalArrivalTime = center \ of \ mass \ of \ Arrival \ distribution.$$

Once the Nominal arrival time and the burst periodicity are inferred, the network may deliver packets, as described above with reference to FIG. 11.

It is worth noting that the network entity is capable of computing and marking packets with jitter, and may use marking for necessary actions. Marking may avoid the need for time synchronization between a core network (CN) and a radio access network (RAN).

Example Methods

Figure 12:
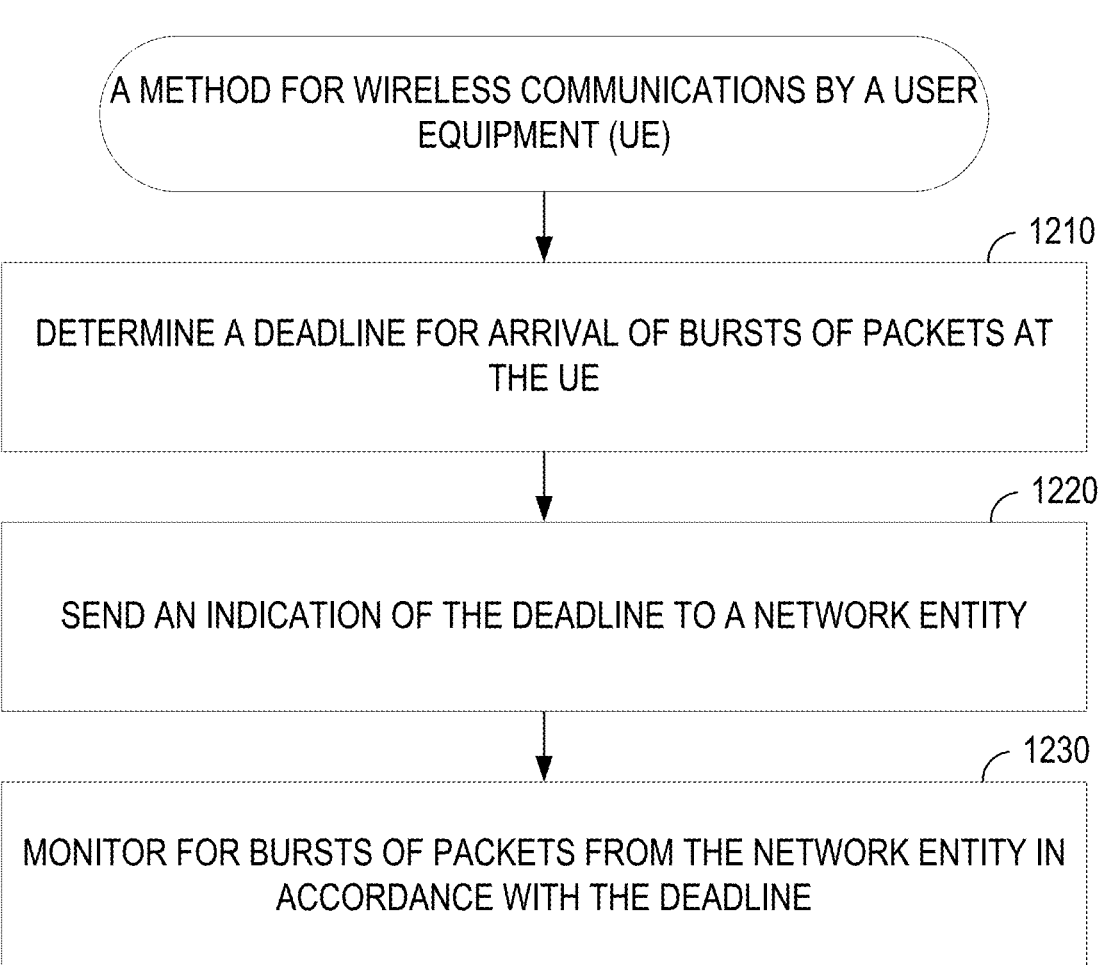
FIG. 12 is a flow diagram illustrating example operations for wireless communication by a UE, in accordance with certain aspects of the present disclosure.

FIG. 12 illustrates example operations 1200 for wireless communication by a user equipment (UE). The operations 1200 may be performed, for example, by a UE (e.g., such as a UE 104 of FIG. 1) to enhance delivery of bursts of packets accounting for jitter, in accordance with certain aspects of the present disclosure.

At 1210, the UE determines a deadline for arrival of bursts of packets at the UE. For example, the bursts of packets may be related to an application, and the UE may determine the deadline for arrival of bursts of packets based on an indication from the application.

At 1220, the UE sends an indication of the deadline to a network entity. For example, the UE may convert the indication from the application to units of transmission time intervals (TTIs), and the UE may indicate the deadline to the network entity in the units of TTIs. In some examples, the units of TTIs may be at least one of a system frame number (SFN) or slot number.

At 1230, the UE monitors for bursts of packets from the network entity in accordance with the deadline. In one example, the UE monitors for the burst of packets according to a periodicity.

Figure 13:
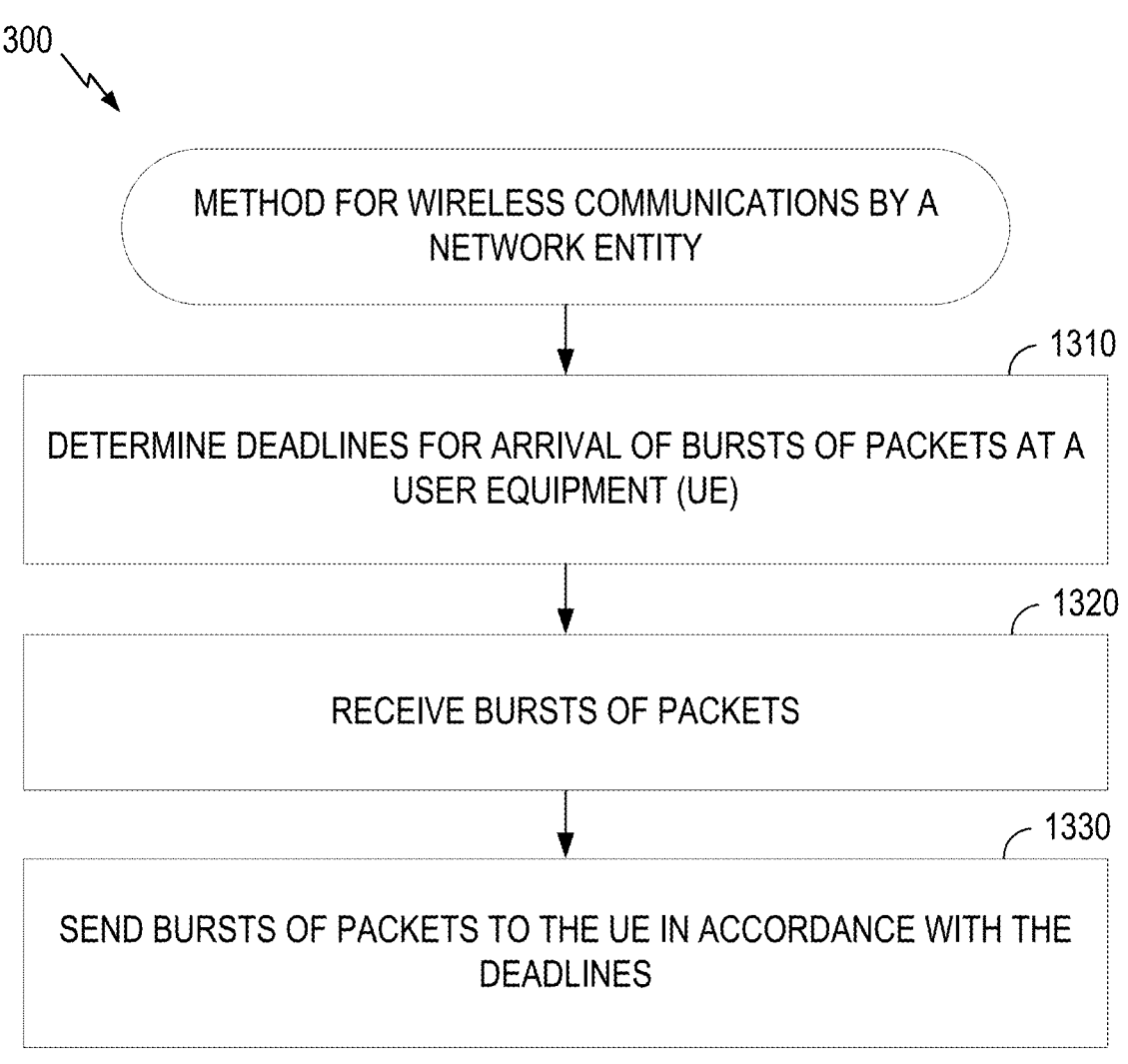
FIG. 13 is a flow diagram illustrating example operations for wireless communication by a network entity, in accordance with certain aspects of the present disclosure.

FIG. 13 illustrates example operations 1300 for wireless communication by a network entity. The operations 1300 may be performed, for example, by a base station (e.g., BS 102 of FIG. 1) to enhance delivery of bursts of packets accounting for jitter, in accordance with certain aspects of the present disclosure.

At 1310, the network entity determines deadlines for arrival of bursts of packets at a user equipment (UE). For example, the network entity may receive an indication of the deadline from the UE.

In another example, the network entity may receive an indication of a periodicity of the bursts of packets, and determine a deadline for a given packet based, at least in part, on the periodicity and the deadline indicated by the UE. The network entity may also receive an indication of a burst number for packets arriving at the network entity, and determine a deadline for a given packet based on the deadline indicated by the UE, the periodicity, and the burst number indicated for that packet.

In another example, the network entity may receive an indication of a nominal packet delay budget (PDB) of packets, and determine a deadline, for a given packet, based on a nominal arrival time for that packet, the nominal PDB, and a periodicity of bursts. In some examples, the network entity may infer at least one of the nominal arrival time or the periodicity.

At 1320, the network entity receives the bursts of packets. For example, the network entity may receive a burst of packets intended for the UE.

At 1330, the network entity sends the bursts of packets to the UE in accordance with the deadlines.

Example Wireless Communication Devices

FIG. 14 depicts an example communications device 1400 that includes various components operable, configured, or adapted to perform operations for the techniques disclosed herein, such as the operations depicted and described with respect to FIG. 13. In some examples, communication device 1400 may be a UE 104 as described, for example with respect to FIGS. 1 and 2.

Communications device 1400 includes a processing system 1402 coupled to a transceiver 1408 (e.g., a transmitter and/or a receiver). Transceiver 1408 is configured to transmit (or send) and receive signals for the communications device 1400 via an antenna 1410, such as the various signals as described herein. Processing system 1402 may be configured to perform processing functions for communications device 1400, including processing signals received and/or to be transmitted by communications device 1400.

Processing system 1402 includes one or more processors 1420 coupled to a computer-readable medium/memory 1430 via a bus 1406. In certain aspects, computer-readable medium/memory 1430 is configured to store instructions (e.g., computer-executable code) that when executed by the one or more processors 1420, cause the one or more processors 1420 to perform the operations illustrated in FIG. 12, or other operations for performing the various techniques discussed herein for deadline-based delivery for downlink traffic with jitter.

In the depicted example, computer-readable medium/memory 1430 stores code 1431 for determining a deadline for arrival of bursts of packets at the UE, code 1432 for sending an indication of the deadline to a network entity, and code 1433 for monitoring for bursts of packets from the network entity in accordance with the deadline.

In the depicted example, the one or more processors 1420 include circuitry configured to implement the code stored in the computer-readable medium/memory 1430, including circuitry 1421 for determining a deadline for arrival of bursts of packets at the UE, circuitry 1422 for sending an indication of the deadline to a network entity, and circuitry 1423 for monitoring for bursts of packets from the network entity in accordance with the deadline.

Various components of communications device 1400 may provide means for performing the methods described herein, including with respect to FIG. 12.

In some examples, means for transmitting or sending (or means for outputting for transmission) may include the transceivers 254 and/or antenna(s) 252 of the UE 104 illustrated in FIG. 2 and/or transceiver 1408 and antenna 1410 of the communication device 1400 in FIG. 14.

In some examples, means for receiving (or means for obtaining) may include the transceivers 254 and/or antenna(s) 252 of the UE 104 illustrated in FIG. 2 and/or transceiver 1408 and antenna 1410 of the communication device 1400 in FIG. 14.

In some examples, means for receiving, allocating, and/or transmitting may include various processing system components, such as: the one or more processors 1420 in FIG. 14, or aspects of the UE 104 depicted in FIG. 2, including receive processor 258, transmit processor 264, TX MIMO processor 266, and/or controller/processor 280 (including deadline-based packet delivery component 281).

Notably, FIG. 14 is an example, and many other examples and configurations of communication device 1400 are possible.

Figure 15:
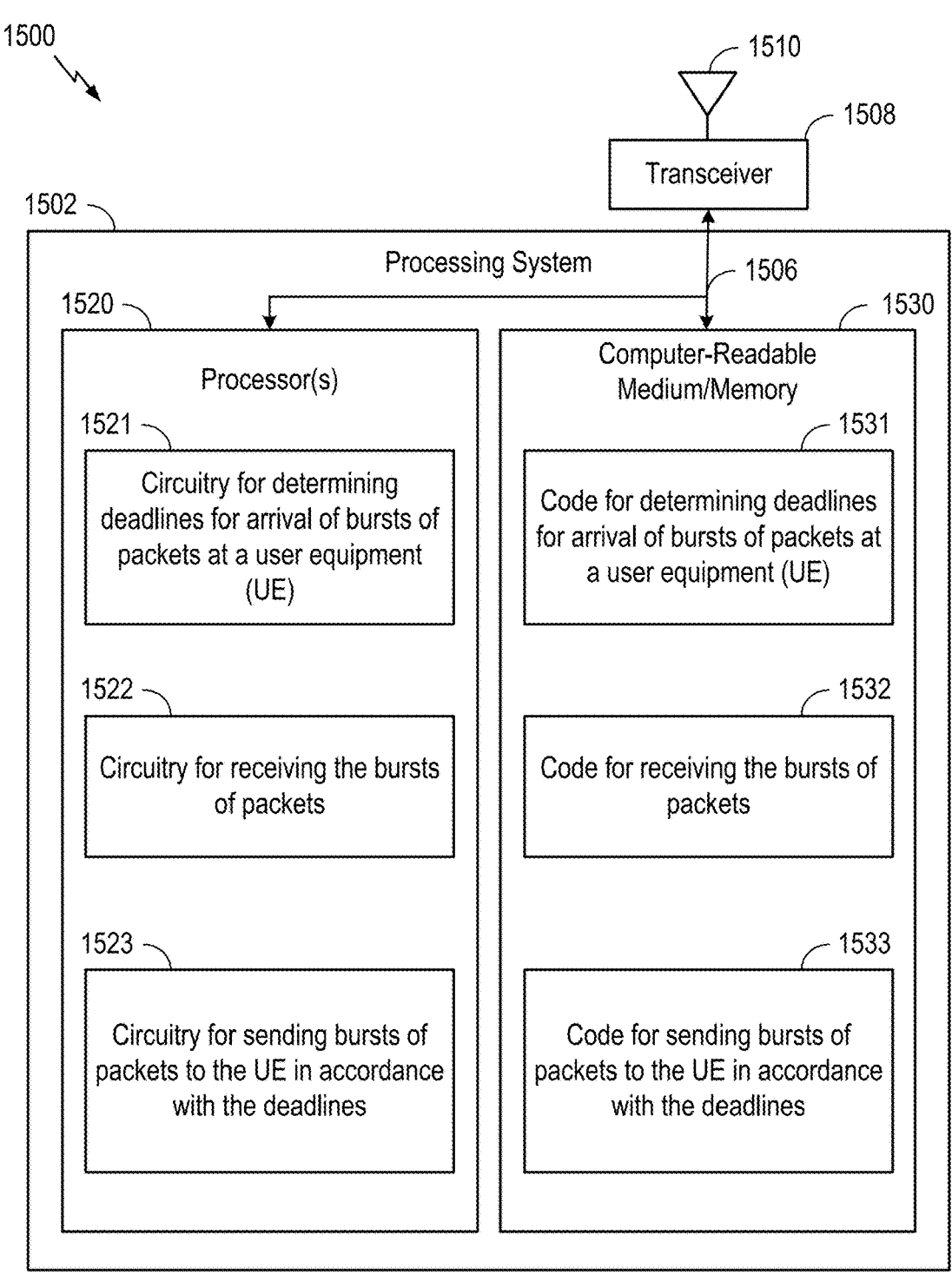
FIG. 15 depicts aspects of an example communications device, in accordance with certain aspects of the present disclosure.

FIG. 15 depicts an example communications device 1500 that includes various components operable, configured, or adapted to perform operations for the techniques disclosed herein, such as the operations depicted and described with respect to FIG. 13. In some examples, communication device 1500 may be a base station 102 as described, for example with respect to FIGS. 1 and 2.

Communications device 1500 includes a processing system 1502 coupled to a transceiver 1508 (e.g., a transmitter and/or a receiver). Transceiver 1508 is configured to transmit (or send) and receive signals for the communications device 1500 via an antenna 1510, such as the various signals as described herein. Processing system 1502 may be configured to perform processing functions for communications device 1500, including processing signals received and/or to be transmitted by communications device 1500.

Processing system 1502 includes one or more processors 1520 coupled to a computer-readable medium/memory 1530 via a bus 1506. In certain aspects, computer-readable medium/memory 1530 is configured to store instructions (e.g., computer-executable code) that when executed by the one or more processors 1520, cause the one or more processors 1520 to perform the operations illustrated in FIG. 13, or other operations for performing the various techniques discussed herein for enhancing delivery of bursts of packets accounting for jitter.

In the depicted example, computer-readable medium/ memory 1530 stores code 1531 for determining deadlines for arrival of bursts of packets at a user equipment (UE), code 1532 for receiving the bursts of packets, and code 1533 for sending bursts of packets to the UE in accordance with the deadlines.

In the depicted example, the one or more processors 1520 include circuitry configured to implement the code stored in the computer-readable medium/memory 1530, including circuitry 1521 for determining deadlines for arrival of bursts of packets at a user equipment (UE), circuitry 1522 for receiving the bursts of packets, and circuitry 1523 for sending bursts of packets to the UE in accordance with the deadlines.

Various components of communications device 1500 may provide means for performing the methods described herein, including with respect to FIG. 13.

In some examples, means for transmitting or sending (or means for outputting for transmission) may include the transceivers 234 and/or antenna(s) 232 of the base station 102 illustrated in FIG. 2 and/or transceiver 1508 and antenna 1510 of the communication device 1500 in FIG. 15.

In some examples, means for receiving (or means for obtaining) may include the transceivers 232 and/or antenna(s) 234 of the base station 102 illustrated in FIG. 2 and/or transceiver 1508 and antenna 1510 of the communication device 1500 in FIG. 15.

In some examples, means for transmitting, determining, and/or processing may include various processing system components, such as: the one or more processors 1520 in FIG. 15, or aspects of the base station 102 depicted in FIG. 2, including receive processor 238, transmit processor 220, TX MIMO processor 230, and/or controller/processor 240 (including deadline-based packet delivery component 241).

Notably, FIG. 15 is an example, and many other examples and configurations of communication device 1500 are possible.

Example Clauses

Implementation examples are described in the following numbered clauses:

Clause 1: A method for wireless communication by a user equipment (UE), comprising: determining a deadline for arrival of bursts of packets at the UE; sending an indication of the deadline to a network entity; and monitoring for bursts of packets from the network entity in accordance with the deadline.

Clause 2: The method of clause 1, wherein: the bursts of packets are related to an application; and the UE determines the deadline based on an indication from application.

Clause 3: The method of clause 2, further comprising: converting the indication from the application to units of transmission time intervals (TTIs), wherein the UE indicates the deadline to the network entity in the units of TTIs.

Clause 4: The method of clause 3, wherein the units of TTIs comprise at least one of a system frame number (SFN) or slot number.

Clause 5: The method of any one of clauses 1-4, wherein the UE monitoring for the burst of packets according to a periodicity.

Clause 6: A method for wireless communication by a network entity, comprising: determining deadlines for arrival of bursts of packets at a user equipment (UE); receiving the bursts of packets; and sending the bursts of packets to the UE in accordance with the deadlines.

Clause 7: The method of clause 6, comprising receiving an indication of the deadline from the UE.

Clause 8: The method of clause 7, comprising: receiving an indication of a periodicity of the bursts of packets; and determining a deadline for a given packet based, at least in part, on the periodicity and the deadline indicated by the UE.

Clause 9: The method of clause 8, comprising: receiving an indication of a burst number for packets arriving at the network entity; and determining a deadline for a given packet based on the deadline indicated by the UE, the periodicity, and the burst number indicated for that packet.

Clause 10: The method of any one of clauses 8-9, wherein: the network entity also receives an indication of a nominal packet delay budget (PDB) of bursts; and the network entity determines a deadline, for a given packet, based on a time window in which the packet arrives at the network entity, wherein the time window is defined based on the deadline indicated by the UE, the nominal PDB, and the periodicity.

Clause 11: The method of any one of clauses 6-10, wherein: the network entity receives an indication of a nominal packet delay budget (PDB) of packets; and the network entity determines a deadline, for a given packet, based on a nominal arrival time for that packet, the nominal PDB, and a periodicity of bursts.

Clause 12: The method of clause 11, wherein: the network entity also receives an indication of at least one of the nominal arrival time or the periodicity.

Clause 13: The method of any one of clauses 11-12, wherein: the network entity infers at least one of the nominal arrival time or the periodicity.

Clause 14: The method of clause 13, wherein the network entity infers the periodicity based on observed times between bursts of packets.

Clause 15: The method of any one of clauses 13-14, wherein the network entity infers the nominal arrival time based on at least one of: observed jitter of bursts of packets or a distribution of observed arrival times of packets.

Clause 16: An apparatus, comprising: a memory comprising executable instructions; one or more processors configured to execute the executable instructions and cause the apparatus to perform a method in accordance with any one of Clauses 1-15.

Clause 17: An apparatus, comprising means for performing a method in accordance with any one of Clauses 1-15.

Clause 18: A non-transitory computer-readable medium comprising executable instructions that, when executed by one or more processors of an apparatus, cause the apparatus to perform a method in accordance with any one of Clauses 1-15.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of enhancing delivery of bursts of packets accounting for jitter in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), comprising:
determining a first deadline for arrival of bursts of packets at the UE based on an indication from an application client operating on the UE;
sending an indication of the first deadline to a network entity; and
monitoring for bursts of packets from the network entity in accordance with a second deadline determined based on the first deadline and a periodicity, wherein the periodicity is subject to jitter.

2. The method of claim 1, wherein the bursts of packets are related to the application client.

3. The method of claim 2, further comprising:
converting the indication from the application client to units of transmission time intervals (TTIs), wherein the UE indicates the first deadline to the network entity in the units of TTIs.

4. The method of claim 3, wherein the units of TTIs comprise at least one of a system frame number (SFN) or slot number.

5. A method for wireless communication by a network entity, comprising:
receiving, from a user equipment (UE), an indication of a first deadline for arrival of at least one of bursts of packets at the UE;
receiving an indication of a periodicity of the bursts of packets;
determining a second deadline for a given packet of the bursts of packets based, at least in part, on the periodicity and the first deadline indicated by the UE; and
sending the bursts of packets to the UE in accordance with the second deadline.

6. The method of claim 5, further comprising:
receiving an indication of a burst number for packets arriving at the network entity, wherein the second deadline for the given packet is determined based on the first deadline indicated by the UE, the periodicity, and the burst number indicated for that packet.

7. The method of claim 5, wherein:
the method further comprises receiving an indication of a nominal packet delay budget (PDB) of the bursts of packets; and
the second deadline, for the given packet, is determined based on a time window in which the given packet arrives at the network entity, wherein the time window is defined based on the first deadline indicated by the UE, the nominal PDB, and the periodicity.

8. A method for wireless communication by a network entity, comprising:
receiving an indication of a nominal packet delay budget (PDB);
determining a deadline, for a given packet of bursts of packets, for arrival of the packet at a user equipment (UE) based on a nominal arrival time for the packet, the nominal PDB, and a periodicity of the bursts, wherein the periodicity is subject to jitter, the network entity inferring the periodicity based on observed times between bursts of packets; and
sending the bursts of packets to the UE in accordance with the deadline.

9. The method of claim 8, further comprising:
receiving an indication of at least one of the nominal arrival time or the periodicity.

10. The method of claim 8, wherein:
the network entity further infers the nominal arrival time.

11. The method of claim 10, wherein the network entity infers the nominal arrival time based on at least one of: observed jitter of the bursts of packets or a distribution of observed arrival times of packets.

12. An apparatus for wireless communications by a user equipment (UE), comprising:
a memory and at least one processor coupled to the memory, the memory and the at least one processor being configured to:

determine a first deadline for arrival of bursts of packets at the UE based on an indication from an application client operating on the UE;

send an indication of the first deadline to a network entity; and monitor for bursts of packets from the network entity in accordance with a second deadline determined based on the first deadline and a periodicity, wherein the periodicity is subject to jitter.

13. The apparatus of claim 12, wherein the bursts of packets are related to the application client.

14. The apparatus of claim 13, wherein the memory and the at least one processor are further configured to:

convert the indication from the application client to units of transmission time intervals (TTIs), wherein the UE indicates the first deadline to the network entity in the units of TTIs.

15. The apparatus of claim 14, wherein the units of TTIs comprise at least one of a system frame number (SFN) or slot number.

16. An apparatus for wireless communications by a network entity, comprising:

a memory and at least one processor coupled to the memory, the memory and the at least one processor being configured to:

receive, from a user equipment (UE), an indication of a first deadline for arrival of at least one of bursts of packets at the UE;

receive an indication of a periodicity of the bursts of packets;

determine a second deadline for a given packet of the bursts of packets based, at least in part, on the periodicity and the first deadline indicated by the UE; and send the bursts of packets to the UE in accordance with the second deadline.

17. The apparatus of claim 16, wherein the memory and the at least one processor are further configured to:

receive an indication of a burst number for packets arriving at the network entity, wherein the second deadline for the given packet is determined based on the first deadline indicated by the UE, the periodicity, and the burst number indicated for that packet.

18. The apparatus of claim 16, wherein the memory and the at least one processor are further configured to:

receive an indication of a nominal packet delay budget (PDB) of the bursts of packets, wherein the second deadline, for the given packet, is determined based on a time window in which the packet arrives at the network entity, wherein the time window is defined based on the first deadline indicated by the UE, the nominal PDB, and the periodicity.

19. An apparatus for wireless communications by a network entity, comprising:

a memory and at least one processor coupled to the memory, the memory and the at least one processor being configured to:

receive an indication of a nominal packet delay budget (PDB);

determine a deadline, for a given packet of bursts of packets, for arrival of the packet at a user equipment (UE) based on a nominal arrival time for the packet, the nominal PDB, and a periodicity of the bursts of packets, wherein the periodicity is subject to jitter, the network entity inferring the periodicity based on observed times between bursts of packets; and send the bursts of packets to the UE in accordance with the deadline.

20. The apparatus of claim 19, wherein the memory and the at least one processor are further configured to:

receive an indication of at least one of the nominal arrival time or the periodicity.

21. The apparatus of claim 19, wherein the memory and the at least one processor are further configured to:

infer the nominal arrival time.

22. The apparatus of claim 21, wherein the memory and the at least one processor are further configured to infer the nominal arrival time based on at least one of:

observed jitter of the bursts of packets or a distribution of observed arrival times of packets.

* * * * *